United States Patent
Decker et al.

(10) Patent No.: US 7,374,403 B2
(45) Date of Patent: May 20, 2008

(54) LOW SOLIDITY TURBOFAN

(75) Inventors: John Jared Decker, Liberty Township, OH (US); Peter Nicholas Szucs, West Chester, OH (US); William Joseph Solomon, Cincinnati, OH (US); Virginia Louise Wilson, Walton, KY (US)

(73) Assignee: General Electric Company, Schenectady, NY (US)

( * ) Notice: Subject to any disclaimer, the term of this patent is extended or adjusted under 35 U.S.C. 154(b) by 524 days.

(21) Appl. No.: 11/100,752

(22) Filed: Apr. 7, 2005

(65) Prior Publication Data

US 2006/0228206 A1    Oct. 12, 2006

(51) Int. Cl.
*F01D 25/24* (2006.01)

(52) U.S. Cl. .............................. 416/223 R; 416/223 A; 416/228; 416/238; 416/242; 416/DIG. 5

(58) Field of Classification Search ..................... 415/1, 415/173.1, 192, 220, 222; 416/223 R, 223 A, 416/228, 238, 242, 243, DIG. 5
See application file for complete search history.

(56) References Cited

U.S. PATENT DOCUMENTS

| | | | |
|---|---|---|---|
| 4,358,246 A | 11/1982 | Hanson et al. | |
| 4,971,520 A | 11/1990 | Van Houten | |
| 5,167,489 A | 12/1992 | Wadia et al. | |
| 5,169,288 A | 12/1992 | Gliebe et al. | |
| 5,273,400 A | 12/1993 | Amr | |
| 5,478,199 A | 12/1995 | Gliebe | |
| 5,584,660 A | 12/1996 | Carter et al. | |
| 5,642,985 A | 7/1997 | Spear et al. | |
| 5,735,673 A * | 4/1998 | Matheny et al. | 416/223 A |
| 5,769,607 A | 6/1998 | Neely et al. | |
| 5,810,555 A | 9/1998 | Savage et al. | |
| 5,906,179 A | 5/1999 | Capdevila | |
| 6,048,174 A | 4/2000 | Samit et al. | |
| 6,059,532 A | 5/2000 | Chen et al. | |
| 6,071,077 A | 6/2000 | Rowlands | |
| 6,315,521 B1 | 11/2001 | Hunt | |
| 6,328,533 B1 | 12/2001 | Decker et al. | |
| 6,338,609 B1 | 1/2002 | Decker et al. | |
| 6,368,061 B1 | 4/2002 | Capdevila | |
| 6,386,830 B1 | 5/2002 | Slipper et al. | |

(Continued)

OTHER PUBLICATIONS

Cumpsty, "Compressor Aerodynamics," 1989, pp: Cover, copyr., variables, 214, and 215.

(Continued)

*Primary Examiner*—Igor Kershteyn
(74) *Attorney, Agent, or Firm*—William S. Andes; Francis L. Conte

(57) ABSTRACT

A turbofan includes a row of fan blades extending from a supporting disk inside an annular casing. Each blade includes an airfoil having opposite pressure and suction sides extending radially in span between a root and tip and axially in chord between leading and trailing edges. Adjacent airfoils define corresponding flow passages therebetween for pressurizing air. Each airfoil includes stagger increasing between the root and tip, and the flow passage has a mouth between the airfoil leading edge and the suction side of an adjacent airfoil and converges to a throat aft from the mouth. The row includes no more than twenty fan blades having low tip solidity for increasing the width of the passage throat.

28 Claims, 6 Drawing Sheets

U.S. PATENT DOCUMENTS

| | | | |
|---|---|---|---|
| 6,471,474 B1 * | 10/2002 | Mielke et al. | 415/199.4 |
| 6,524,070 B1 * | 2/2003 | Carter | 416/193 A |
| RE38,040 E | 3/2003 | Spear et al. | |
| 6,561,760 B2 | 5/2003 | Wadia et al. | |
| 6,561,761 B1 | 5/2003 | Decker et al. | |
| 6,562,227 B2 | 5/2003 | Lamphere et al. | |
| 6,991,428 B2 * | 1/2006 | Crane | 416/2 |

OTHER PUBLICATIONS

Kandebo, "Geared-Turbofan Engine Design Targets Cost, Complexity," Av. Week & Space Tech., vol. 148, No. 8, Feb. 1998, 2 pages.

www.rolls-royce.com, "Trent 1000," copyright 2004, 3 pages.

A. Wadia et al, "Forward Swept Rotor Studies in Multistage Fans with Inlet Distortion," ASME Turbo Expo 2002, Amsterdam, The Netherlands, Jun. 2002, pp. 1-11.

Pratt & Whitney Canada, "PW 500," www.pwc.ca, copyright 2000-2003, 2 pages.

Aerospace Engineering Online, "Pratt & Whitney's Next Leap in Engine Technologies," www.sae.org, downloaded Feb. 18, 2005, 3 pages.

Aerospace Engineering Online, "Pratt & Whitney Gearing up the PW 800," www.sae.org, Aug. 2001, 4 pages.

Kandebo, "Military Technologies Finging Homes in Commercial Engines," www.AviationNow.com, Jun. 1999, 6 pages.

\* cited by examiner

LOW SOLIDITY TURBOFAN

BACKGROUND OF THE INVENTION

The present invention relates generally to gas turbine engines, and, more specifically, to turbofan aircraft engines.

In a turbofan engine air is pressurized in a compressor and mixed with fuel in a combustor for generating hot combustion gases. A high pressure turbine (HPT) extracts energy from the combustion gases to power the compressor. A low pressure turbine (LPT) extracts additional energy from the combustion gases to power the fan disposed upstream from the compressor.

The primary design objective of aircraft turbofan engines is to maximize efficiency thereof for propelling an aircraft in flight, and correspondingly reduce fuel consumption. Accordingly, the various cold and hot section rotor and stator components which define the internal flow passages for the pressurized air and combustion gases, and which extract energy from those gases, are specifically designed for maximizing the efficiency thereof while correspondingly obtaining a long useful life.

The turbofan itself includes a row of large fan rotor blades extending radially outwardly from the perimeter of a supporting rotor disk. The fan is powered by the LPT for pressurizing the incident air for producing a majority of propulsion thrust discharged from the fan outlet. Some of the fan air is channeled into the compressor wherein it is pressurized and mixed with fuel for generating the hot combustion gases from which energy is extracted in the various turbine stages, and then discharged through a separate core engine outlet.

Turbofan engines are continually being developed and improved for maximizing their thrust capability with the greatest aerodynamic efficiency possible. Since the fan produces a substantial amount of thrust during operation, noise is also generated therefrom and should be reduced as much as possible consistent with the various competing design objectives.

For example, fan blades are typically designed for maximizing the aerodynamic loading thereof to correspondingly maximize the amount of propulsion thrust generated during operation. However, fan loading is limited by stall, flutter, or other instability parameters of the air being pressurized.

Accordingly, modern turbofan engines are designed with a suitable value of stability and stall margin over their operating cycle from takeoff to cruise to landing of the aircraft to ensure acceptable operation and performance of the engine without overloading the capability of the turbofan.

Furthermore, modern turbofan engines have relatively large diameter turbofans which rotate at sufficient rotary velocity to create supersonic velocity of the blade tips relative to the incident air stream. The blade tips are therefore subject to the generation of shock waves as the air is channeled and pressurized in the corresponding flow passages defined between adjacent fan blades.

Accordingly, each fan blade is specifically tailored and designed from its radially inner platform to its radially outer tip and along its circumferentially opposite pressure and suction sides which extend in chord axially between the opposite leading and trailing edges thereof. The pressure side of one airfoil defines with the suction side of an adjacent airfoil the corresponding flow passage from root to tip of the blades through which the air is channeled during operation.

Each airfoil is typically twisted with a corresponding angle of stagger from root to tip, with airfoil tips being aligned obliquely between the axial and circumferential directions of the fan.

During operation, the incoming ambient air flows at different relative velocities through the inter-blade flow passages from root to tip of the blades including subsonic airflow at the blade roots and radially outwardly thereof up to the supersonic velocity of the air at the blade tips in various portions of the operating range.

Fan stall margin is a fundamental design requirement for the turbofan and is affected by the aerodynamic fan loading, the fan solidity, and the fan blade aspect ratio. These are conventional parameters, with the fan loading being the rise in specific enthalpy across the fan blades divided by the square of the tip speed.

Blade solidity is the ratio of the blade chord, represented by its length, over the blade pitch, which is the circumferential spacing of the blades at a given radius or diameter from the axial centerline axis. In other words, blade pitch is the circumferential length at a given diameter divided by the number of blades in the full fan blade row. And, the fan blade aspect ratio is the radial height or span of the airfoil portion of the blade divided by its maximum chord.

Conventional experience or teachings in the art indicate that when inlet Mach numbers are sufficiently high that passage shock can separate the suction surface boundary layer of the air in the inter-blade flow passages, good efficiency requires that the solidity should be high to allow the flow to reattach.

In one exemplary or reference turbofan found in public use and on sale for more than a year in the USA, a large diameter turbofan having twenty-two fan blades in the full row has a relatively high solidity at the blade tips of about 1.29. These fan blades are used in a high bypass ratio turbofan engine with a bypass ratio over 7, with the corresponding pressure ratio over the fan blades being relatively high in value and greater than about 1.5. The large fan diameter effects supersonic velocity of the blade tips during operation which correspondingly generates normal shock waves at the airfoil tips during operation which affect performance.

Conventional design practice for turbofan efficiency and adequate fan stall margin typically require the relatively high tip solidity which is generally equal to the fan tip relative Mach number at the design point, such as cruise operation. In other words, the tip Mach number is suitably greater than one (1.0) for supersonic flow, and the fan tip solidity is correspondingly greater than one and generally equal to the tip relative Mach number for good designs.

The design considerations disclosed above are merely some of the many competing design parameters in designing a modern turbofan primarily for good aerodynamic performance and efficiency, as well as for good mechanical strength for ensuring a long useful life thereof. Each fan blade twists from root to tip, and the opposite pressure and suction sides thereof also vary in configuration to specifically tailor the flow passages from root to tip for maximizing fan efficiency with suitable stall margin and mechanical strength.

The resulting turbofan design is a highly complex design with three dimensional variation of the pressure and suction sides of the individual airfoils across their axial chord and over their radial span. And, the individual fan blades cooperate with each other in the full row of blades to define the inter-blade flow passages and to effect the resulting aerodynamic performance and stall margin of the entire fan.

Accordingly, it is desired to further improve the efficiency of the modern turbofan while maintaining adequate stability and stall margin notwithstanding the various competing design objectives addressed in part above.

BRIEF DESCRIPTION OF THE INVENTION

A turbofan includes a row of fan blades extending from a supporting disk inside an annular casing. Each blade includes an airfoil having opposite pressure and suction sides extending radially in span between a root and tip and axially in chord between leading and trailing edges. Adjacent airfoils define corresponding flow passages therebetween for pressurizing air. Each airfoil includes stagger increasing between the root and tip, and the flow passage has a mouth between the airfoil leading edge and the suction side of an adjacent airfoil and converges to a throat aft from the mouth. The row includes no more than twenty fan blades having low tip solidity for increasing the width of the passage throat.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
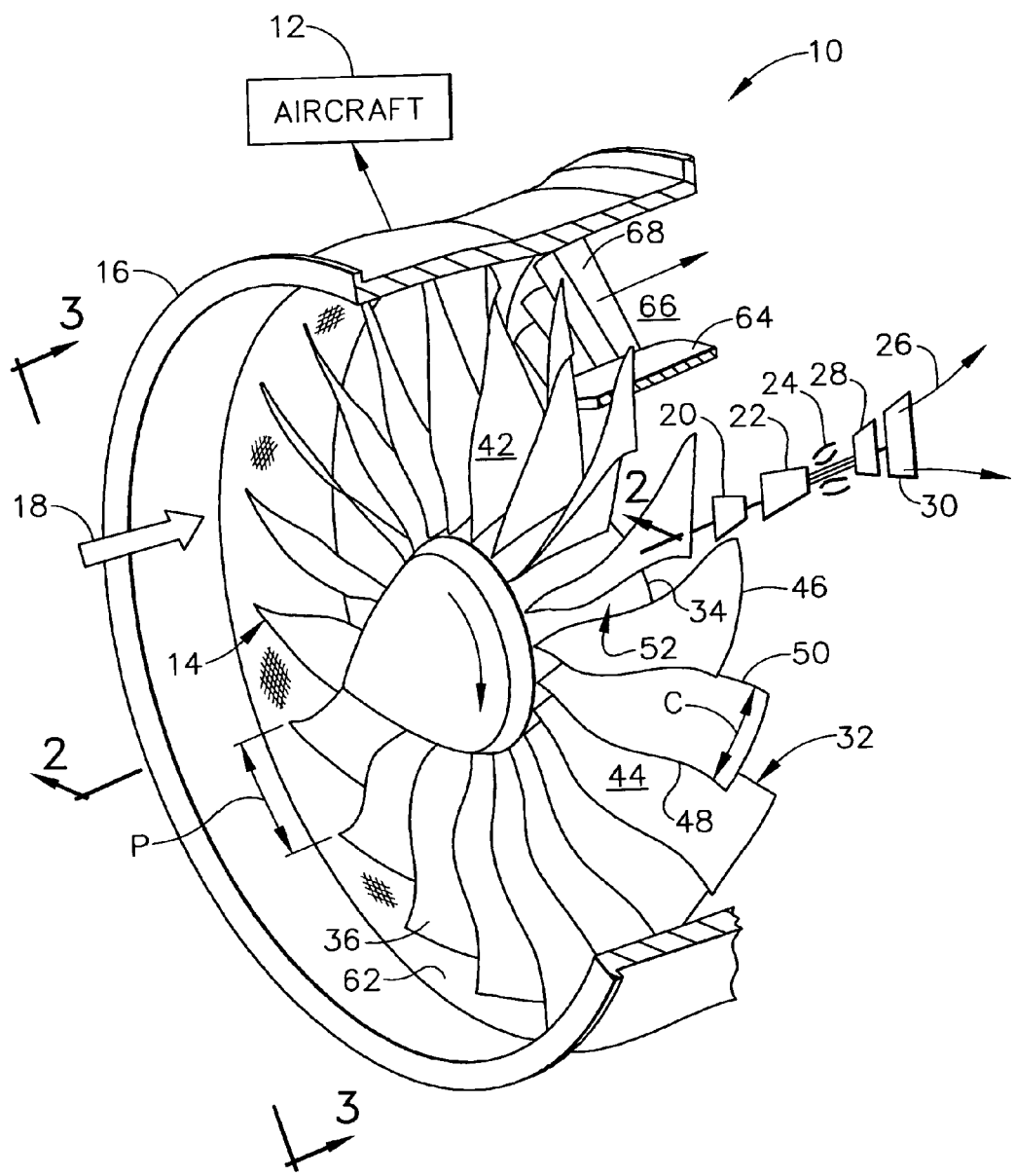
FIG. 1 is a partly schematic isometric view of a turbofan in an aircraft engine for powering an aircraft in flight.

Illustrated in FIG. 1 is a gas turbine engine 10 configured for powering an aircraft 12 in flight, and suitably mounted therein. The engine is axisymmetrical about a longitudinal or axial centerline axis and includes a fan or turbofan 14 suitably mounted coaxially inside a surrounding annular fan casing 16.

During operation, ambient air 18 enters the inlet end of the fan 14 and is pressurized thereby for producing propulsion thrust for propelling the aircraft in flight. A portion of the fan air is suitably channeled in turn through a low pressure or booster compressor 20 and a high pressure compressor 22 which further pressurize the air in turn.

The pressurized air is mixed with fuel in an annular combustor 24 for generating hot combustion gases 26 which are discharged in the downstream direction. A high pressure turbine (HPT) 28 first receives the hot gases from the combustor for extracting energy therefrom, and is followed in turn by a low pressure turbine (LPT) 30 which extracts additional energy from the combustion gases discharged from the HPT. The HPT is joined by one shaft or rotor to the high pressure compressor 22, and the LPT is joined by another shaft or rotor to both the booster compressor 20 and the fan 14 for powering thereof during operation.

The exemplary turbofan engine 10 illustrated in FIG. 1 may have any conventional configuration and operation for powering an aircraft in flight from takeoff to cruise to landing, but is modified as further described hereinbelow for increasing the aerodynamic efficiency of the fan 14 while maintaining suitable stability and stall margin thereof during the operating cycle.

Figure 2:
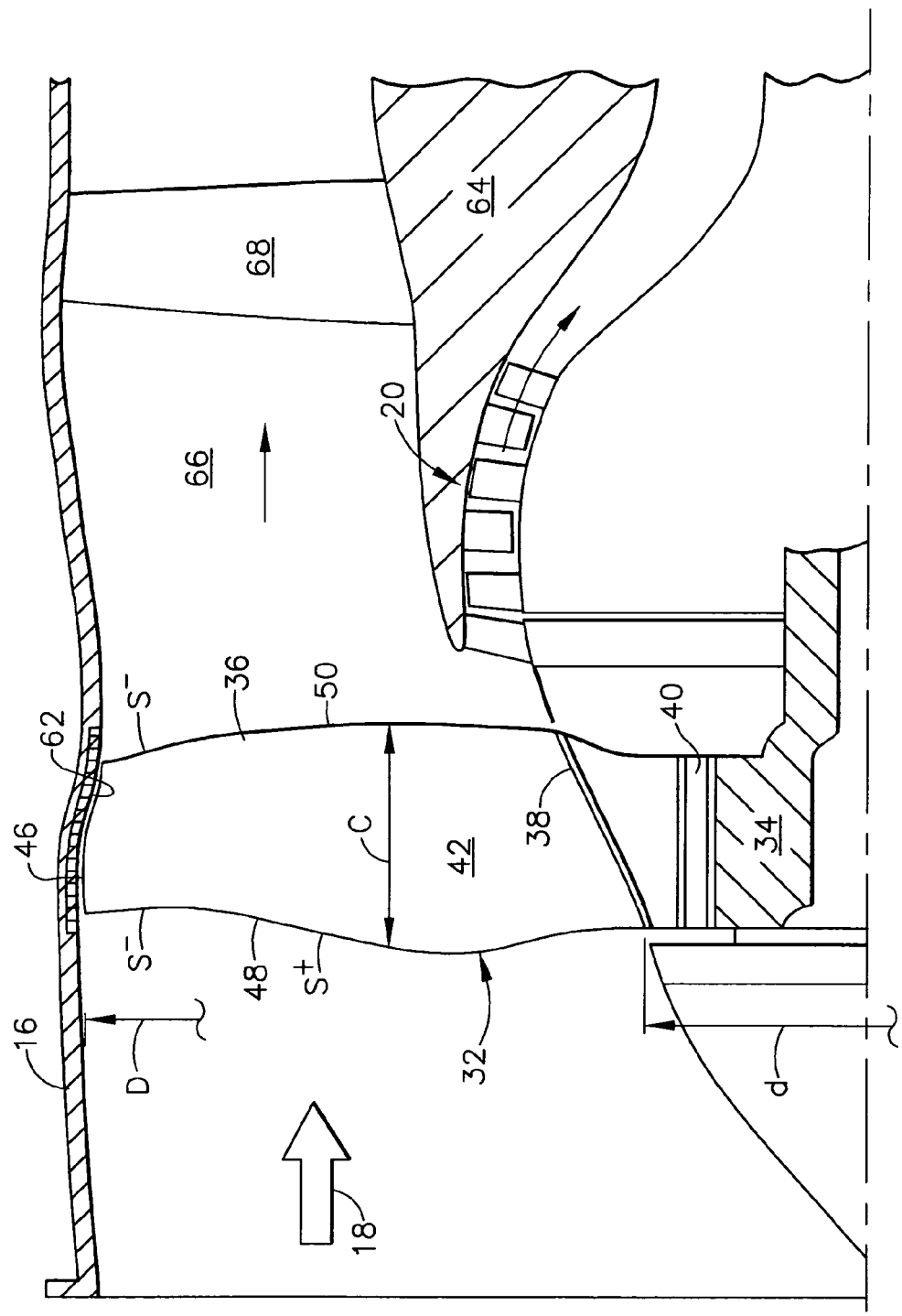
FIG. 2 is an axial sectional view through the turbofan portion of the engine illustrated in FIG. 1 and taken along line 2-2.

More specifically, FIGS. 1 and 2 illustrate an exemplary embodiment of the turbofan 14 which includes a row of fan rotor blades 32 extending radially outwardly in span from the perimeter rim of a supporting rotor disk 34. As shown in FIG. 2, each blade includes an airfoil 36 extending outwardly from a platform 38 defining the radially inner boundary of the fan air flowpath, which platform may be integrally formed with the airfoil or a separate component. Each blade also includes an integral dovetail 40 extending radially inwardly from the airfoil below the platform for mounting each blade in a corresponding dovetail slot in the rim of the rotor disk.

The fan blades may be made from suitable high strength materials like titanium or carbon fiber composites. For example, the majority of the blade may be formed of carbon fiber composite reinforced with titanium shields along the leading and trailing edges, and along the tip.

As illustrated in FIGS. 1 and 2, each airfoil 36 has a suitable aerodynamic configuration including a generally concave pressure side 42 and a circumferentially opposite, generally convex suction side 44. The opposite sides of each airfoil extend radially in span from the inner root end thereof at the platform 38 to the radially outer distal tip 46 disposed closely adjacent to the fan stator casing 16 for providing a relatively small tip clearance or gap therebetween.

Figure 3:
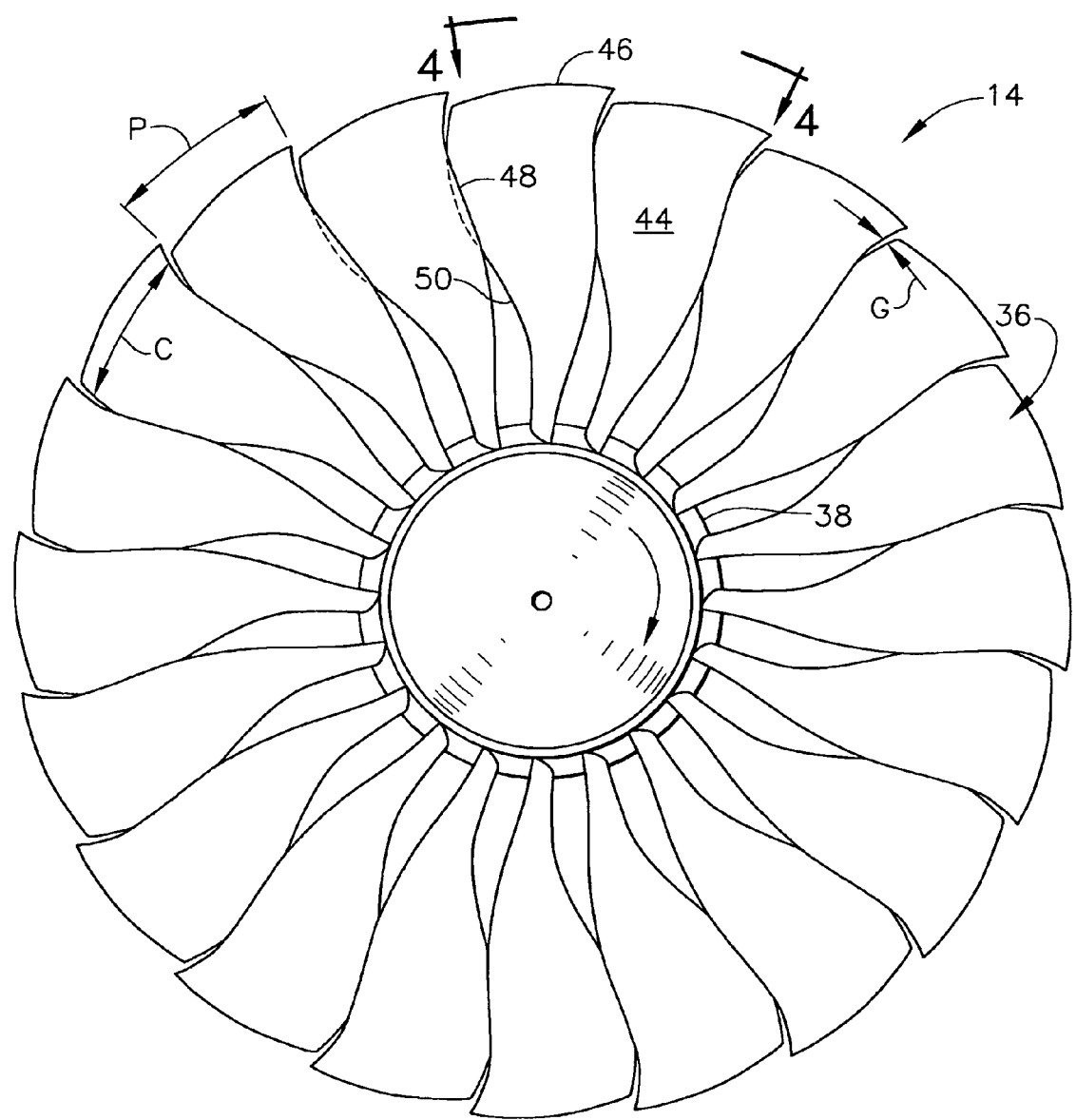
FIG. 3 is a forward-facing-aft elevational view of the turbofan illustrated in FIG. 1 and taken along line 3-3.

As shown in FIGS. 2 and 3, each airfoil extends axially in chord C between opposite leading and trailing edges 48,50, with the chord varying in length over the span of the airfoil.

Figure 4:
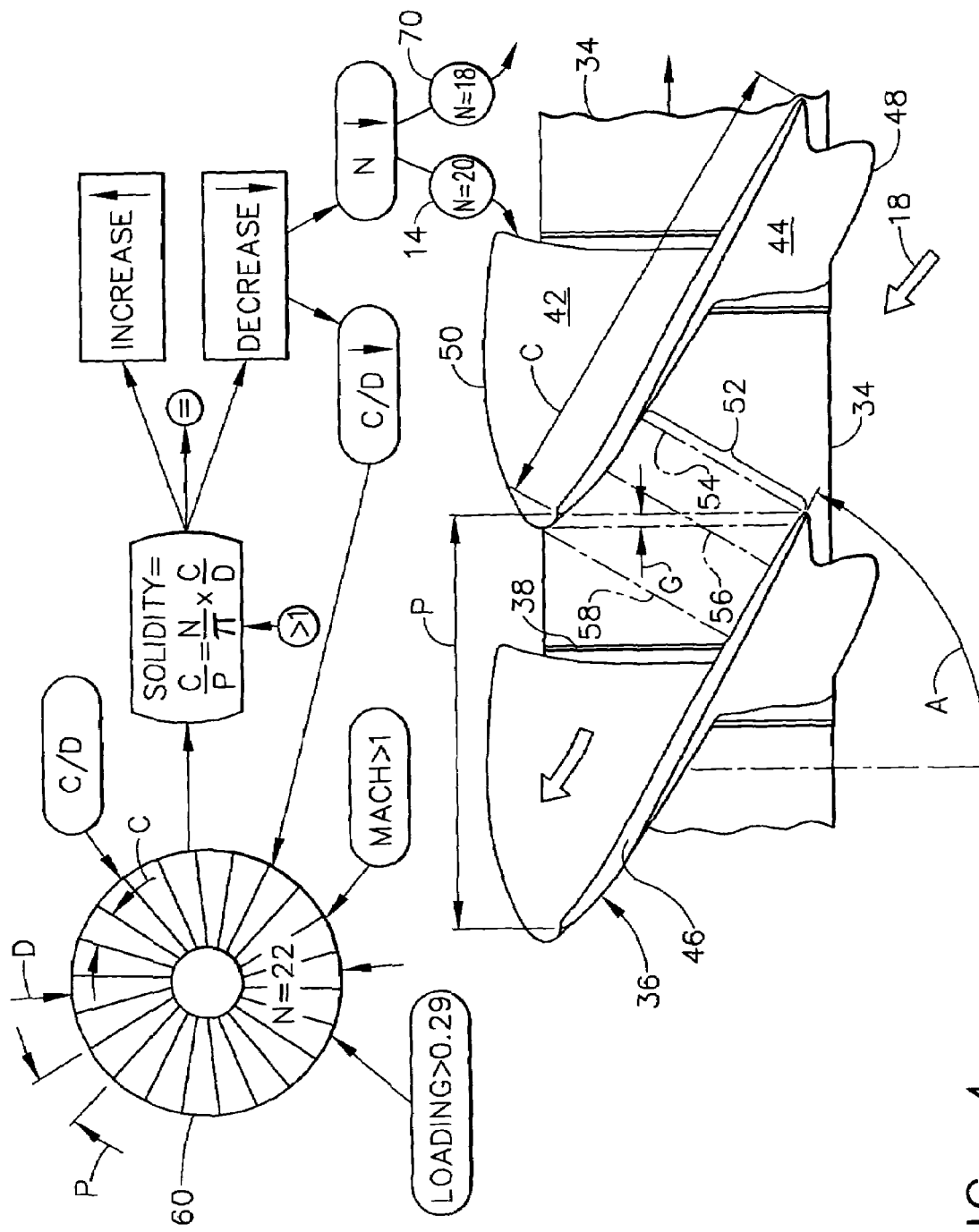
FIG. 4 is a top planiform view of two adjacent fan blades illustrated in FIG. 3 and taken generally along line 4-4 in conjunction with a corresponding flowchart.

As shown in FIG. 4, adjacent airfoils 36 define circumferentially therebetween corresponding flow passages 52 for pressurizing the air 18 during operation. Each of the airfoils 36 includes stagger or twist represented by the stagger angle A from the axial or longitudinal axis, which stagger increases between the root and tip of the airfoil.

For example, the stagger angle A at the blade tip may be substantial, and about 60 degrees, to position the leading edge 48 of one airfoil circumferentially adjacent but axially spaced from the suction side 44 of the next adjacent airfoil aft from the leading edge thereof to define a corresponding mouth 54 for the flow passage between the opposing pressure and suction sides of the adjacent airfoils. The contours and stagger of the adjacent airfoils over the radial span of the blades cause each flow passage to converge or decrease in flow area to a throat 56 of minimum flow area spaced aft from the mouth along most, if not all, of the radial span.

As further illustrated in FIG. 4, the relatively high airfoil stagger A also positions the trailing edge 50 of one airfoil 36 circumferentially adjacent to the pressure side 42 of the next adjacent airfoil while also being spaced axially therefrom in the tip region to define a corresponding discharge or outlet 58 for the corresponding flow passage between adjacent airfoils. In this way, the incoming air 18 is channeled in the corresponding flow passages 52 between adjacent airfoils as they rotate clockwise in FIGS. 1, 3, and 4 for pressurizing the air to produce the propulsion thrust during operation.

FIGS. 1-4 illustrate in general the typical configuration of a modern turbofan aircraft engine having a row of fan blades with corresponding stagger or twist from root to tip. As indicated in the Background section, there are many competing design parameters for the turbofan for balancing fan efficiency with stability and stall margin and with aeromechanical parameters affecting flutter and noise and with mechanical strength of the fan blade subject both to centrifugal force during operation and aerodynamic loading.

FIG. 4 illustrates schematically a method of improving aerodynamic efficiency of the turbofan engine 10 illustrated in FIG. 1 by derivation for example. Modern turbofan engines are typically derived from existing engines having proven experience in commercial service. Corresponding changes or modifications thereof may then be effected in accordance with conventional design practices, which, however, must be balanced in view of the various competing parameters such as efficiency and stall margin, for example. Further increasing efficiency and aerodynamic loading typically requires reduction in stall margin, and must therefore be balanced for overall performance.

FIG. 4 illustrates schematically a pre-existing or conventional design of a fan 60 for use in the type of turbofan engine illustrated in FIG. 1. This pre-existing fan has a full complement of only twenty-two fan blades of suitably large outer diameter D for effecting supersonic airflow at the tips during operation.

The pre-existing fan 60 also has a corresponding solidity which is a conventional parameter equal to the ratio of the airfoil chord C, as represented by its length, divided by the circumferential pitch P or spacing from blade to blade at the corresponding span position or radius.

The circumferential pitch is equal to the circumferential length at the specific radial span divided by the total number of fan blades in the blade row. Accordingly, the solidity is directly proportional to the number of blades and chord length and inversely proportional to the diameter as shown schematically in FIG. 4.

As indicated above, modern design practice requires the solidity of the blades at the airfoil tips to be generally similar in magnitude to the relative Mach number of the flow stream at the airfoil tips. In this exemplary embodiment, the tip solidity of the pre-existing fan 60 is relatively high at about 1.29 and corresponds well with a similar tip relative Mach number of also about 1.29.

Conventional practice as indicated above requires relatively high tip solidity for maintaining good efficiency in a supersonic blade tip design subject to shock in the flow passages between the adjacent airfoils, and therefore increasing solidity is one option, of the various design parameters for a modern turbofan, in producing a derivative fan. Or, tip solidity may remain the same, or equal, in the derivative fan.

However, it has been discovered that notwithstanding this conventional practice for relatively high solidity in modern turbofans, a substantial improvement in efficiency while maintaining adequate stability and stall margin may be obtained by decreasing tip solidity, and not increasing tip solidity. As indicated above, solidity is proportional to the number of fan blades and the ratio of the airfoil chord divided by the diameter of the fan.

Accordingly, solidity may be decreased by decreasing the number of fan blades, decreasing the airfoil chord, or increasing the outer diameter of the fan. However, the fan outer diameter is typically a given parameter for a specifically sized turbofan engine. And, it has been further discovered that reducing solidity by reducing the length of the chord is detrimental to turbofan efficiency, whereas reducing the blade count to reduce solidity can improve turbofan efficiency.

FIG. 4 illustrates schematically these various options in turbofan design based on the blade solidity. Decreasing solidity by reducing the chord to diameter C/D ratio maintains constant the number of fan blades, for example twenty-two, yet analysis indicates a reduction in efficiency.

Correspondingly, the chord to diameter C/D ratio may remain constant or equal between the turbofan designs, with instead the number of fan blades being reduced to twenty or eighteen in the preferred embodiments.

Accordingly, aerodynamic efficiency may be improved in the turbofan engine 10 illustrated in FIG. 1 by deriving the fan 14 from the pre-existing fan 60 and reducing the solidity at the airfoil tips by reducing the number of blades from twenty-two to either twenty or eighteen, for example, while maintaining substantially equal or constant the same ratio of the tip chord over the tip diameter C/D in the derived fan 14 as originally found in the preexisting fan.

Furthermore, the reduction in number of fan blades increases the circumferential pitch P between the airfoils and increases the flow area of the flow passages 52, in particular at the throats 56 thereof, for reducing flow blockage during operation, and specifically at the airfoil tips subject to supersonic operation.

Accordingly, the derived turbofan 14 illustrated in FIGS. 1-4 includes no more than twenty of the fan blades 32 effected by reducing the tip solidity which has a relatively low magnitude at the tips 46 to position the leading edge 48 of each tip 46 circumferentially near the trailing edge 50 of the next adjacent tip 46, and correspondingly increase the width of the throat 54 normal or perpendicular between the opposing pressure and suction sides of adjacent airfoils.

The reduction in fan blade number while maintaining substantially constant the chord to diameter C/D ratio at the airfoil tips has significant advantages in the new turbofan including an increase in efficiency while maintaining adequate stability and stall margin, as well as reducing noise, as well as reducing weight and cost due to the fewer fan blades.

Quite significant in the low solidity turbofan design is the substantial reduction in flow blockage at the passage throats which more than offsets the decreased solidity effect on aerodynamic performance. Modern computational flow dynamics analysis predicts that lower solidity through reduced blade number is beneficial to cruise efficiency whereas lower solidity through reduction of the chord to diameter C/D ratio would be detrimental to cruise efficiency, which has been confirmed by testing.

FIG. 3 is a front view of the turbofan 14, with FIG. 4 being a top planiform view which illustrate the substantial change in appearance of the turbofan as opposed to typical high solidity turbofans in which the adjacent fan blades substantially overlap each other circumferentially due to the high solidity and high stagger of the airfoils.

In contrast, the tip solidity of the turbofan illustrated in FIGS. 3 and 4 is relatively low in magnitude, while still being greater than about 1.0 to provide a circumferential gap G between the leading and trailing edges 48,50 of adjacent tips 46.

In particular, since the low solidity is effected by reducing the blade count instead of reducing the chord to diameter C/D ratio, this ratio, and chord, remain relatively large in value, which along with the increased circumferential pitch P and large stagger A of the airfoils is effective to provide the circumferential gap G locally between the leading and trailing edges of the adjacent tips.

The configuration of the flow passage 52 illustrated in FIG. 4 is particularly important to efficient operation of the fan, and in particular at the airfoil tips subject to supersonic flow. The specific profiles of the pressure and suction sides of the individual airfoils, the lateral thickness of the airfoil, the root to tip stagger A of the airfoils and, of course, the reduced solidity due to the reduction in blade count while maintaining equal the chord to diameter C/D ratio are all used to define each flow passage 52.

In particular, the airfoil tips 36 are locally angled and vary in width between the leading and trailing edges 48,50 to typically converge the flow passage 52 at the airfoil tips from the mouth 54 to the throat 56 and then diverge the flow passage also at the tip from the throat 56 to the outlet 58. Alternatively, the mouth and throat of the flow passages at the airfoil tips may be coincident in one plane at the leading edges, with the flow passages still diverging aft from the throats at the leading edges to the passage outlets at the trailing edges.

The convergence angle or slope between the mouth and the throat, and the divergence angle or slope between the throat and the outlet may be specifically designed for maximizing efficiency during supersonic operation of the blade tips in which aerodynamic shock is generated as the airflow is reduced in speed in the converging portion to choked flow of Mach 1 at the throat 56 followed in turn by subsonic diffusion in the diverging portion of the flow passage from or aft of the throat to the outlet.

The ratio of the flow area at the passage outlet 58 over the flow area at the throat 56 is a conventional measure of effective camber of the airfoils. The actual amount of airfoil camber at the tips thereof may be increased slightly over a conventional turbofan design to allow the turbofan to tolerate the lower tip solidity during part-speed operation.

As indicated above, a modern turbofan is designed for an operating range from takeoff to cruise to landing, with cruise operation being predominant and for which maximum efficiency and operability are desired. However, part-speed performance must also be considered in good turbofan design and accommodated by the higher camber introduced at the blade tips for the low solidity turbofan design.

Accordingly, part-speed operability may be improved by increasing the camber of the airfoils 36 at the tips 46 thereof in conjunction with the reduction in solidity by reduction in blade count.

Since improved efficiency of the fan may be obtained through lowering solidity, the turbofan design may itself be otherwise conventional except as modified in accordance with the present disclosure. For example, the airfoils 36 illustrated in FIGS. 1-4 are relatively large in diameter for supersonic tip operation in a modern turbofan engine with a substantial pressure ratio of about 1.5. The corresponding bypass ratio of the fan air which bypasses the core engine is about 7.5 or greater. And, the airfoils may be provided with suitable aerodynamic sweep which is preferably forward or negative (S−) at the tips 46 of the airfoils, and preferably negative along both the leading and trailing edges 48,50 thereof.

The individual airfoils may have a large chord barreling near their midspan as illustrated in FIG. 2 with aft or positive aerodynamic sweep (S+) along a portion of the leading edge above the midspan if desired. This form of modern turbofan blade is disclosed in substantial detail in U.S. Pat. No. 6,328,533, and is incorporated herein by reference.

Aerodynamic sweep is also a conventional term of art and is disclosed in detail in U.S. Pat. No. 5,167,489, also incorporated herein by reference. The forward tip sweep in the fan blades improves efficiency during supersonic operation of the blade tips.

FIGS. 1 and 2 also illustrate that the turbofan includes an annular tip shroud 62 suitably mounted flush inside the fan stator casing 16 and directly surrounding the airfoil tips 46 which are positioned closely adjacent thereto to define a correspondingly small tip clearance therewith. The tip shroud 62 may be conventional in configuration, such as a lightweight honeycomb structure, with a substantially smooth inner surface facing the blade tips. The low solidity turbofan enjoys improved efficiency while maintaining adequate stability and stall margin without the need for stability enhancing features such as annular grooves which could otherwise be formed in the tip shroud.

As shown in FIG. 2, the fan casing 16 is spaced radially outwardly from an inner casing 64 which surrounds the core engine to define an annular bypass duct 66 radially therebetween. The aft end of the bypass duct 66 defines the outlet for a majority of the fan air used in producing propulsion thrust for the engine.

Spaced downstream or aft from the row of fan blades 32 is a row of outlet guide vanes 68 extending radially inwardly from the fan casing 16 to join the inner casing 64. The number of vanes 68 is preferably more than twice the number of the fan blades 32 for reducing noise from the fan during operation.

Noise reduction, and in particular spinning mode noise, is disclosed in U.S. Pat. No. 5,169,288, incorporated herein by reference, which patent may be used for determining the specific number of vanes 68 relative to the specific number of fan blades, and for example may number 48 vanes for both the twenty and eighteen fan blade species.

FIG. 2 illustrates another feature which may be introduced into the turbofan. In particular, the airfoil tips 46 may have an axially arcuate contour radially outwardly between the leading and trailing edges, and the adjacent tip shroud 62 may have a complementary axially arcuate contour radially inwardly for maintaining a substantially uniform tip clearance radially therebetween, and axially between the leading and trailing edges 48,50 of the airfoils. In one embodiment, the forward portion of the airfoil tip 46 is convex followed in turn by a concave aft portion. Correspondingly, the tip shroud 46 has a forward concave portion followed by a convex aft portion for reducing tip losses and flow blockage during supersonic operation of the fan blades in particular.

U.S. Pat. No. 6,338,609 discloses particular details of this special tip arrangement and is incorporated herein by reference.

Furthermore, the blade platforms 38 illustrated in FIG. 2 may be fluted for further improving aerodynamic performance of the turbofan. Fluted platforms or radially inner endwalls are disclosed in more detail in U.S. Pat. No. 6,561,761, also incorporated herein by reference.

The incorporation by reference of these various patents listed above are merely exemplary of the various modern features which may be incorporated in the turbofan 14 for fully maximizing efficiency thereof. These and other conventional features may be used in the turbofan for conventional advantage, in addition to the improved modification of the turbofan by reducing tip solidity through blade count instead of reducing chord to diameter C/D ratio.

The twenty-two fan blades in the pre-existing turbofan 60 illustrated in FIG. 4 is already a relatively low number of fan blades in a modern turbofan engine. However, reducing tip solidity by reducing blade count instead of the chord to diameter C/D ratio permits a further improvement of turbofan efficiency as disclosed above, and in two embodiments analyzed using modern computational flow dynamics analysis and tested, only twenty or only eighteen of the fan blades 32 may be used in the improved turbofan design, with the chord to diameter C/D ratio at the airfoil tips 46 being the same or equal in both species or designs. Although the individual fan blades may be scaled in size with the constant chord to diameter C/D ratio, the collective assembly of fan blades in the resulting turbofan cannot be scaled in view of the desirable reduction in tip solidity by the corresponding reduction in blade count.

FIGS. 1-4 illustrate one embodiment or species in which tip solidity is reduced through blade count reduction from twenty-two to twenty, with a corresponding tip solidity no greater than about 1.2.

Figure 5:
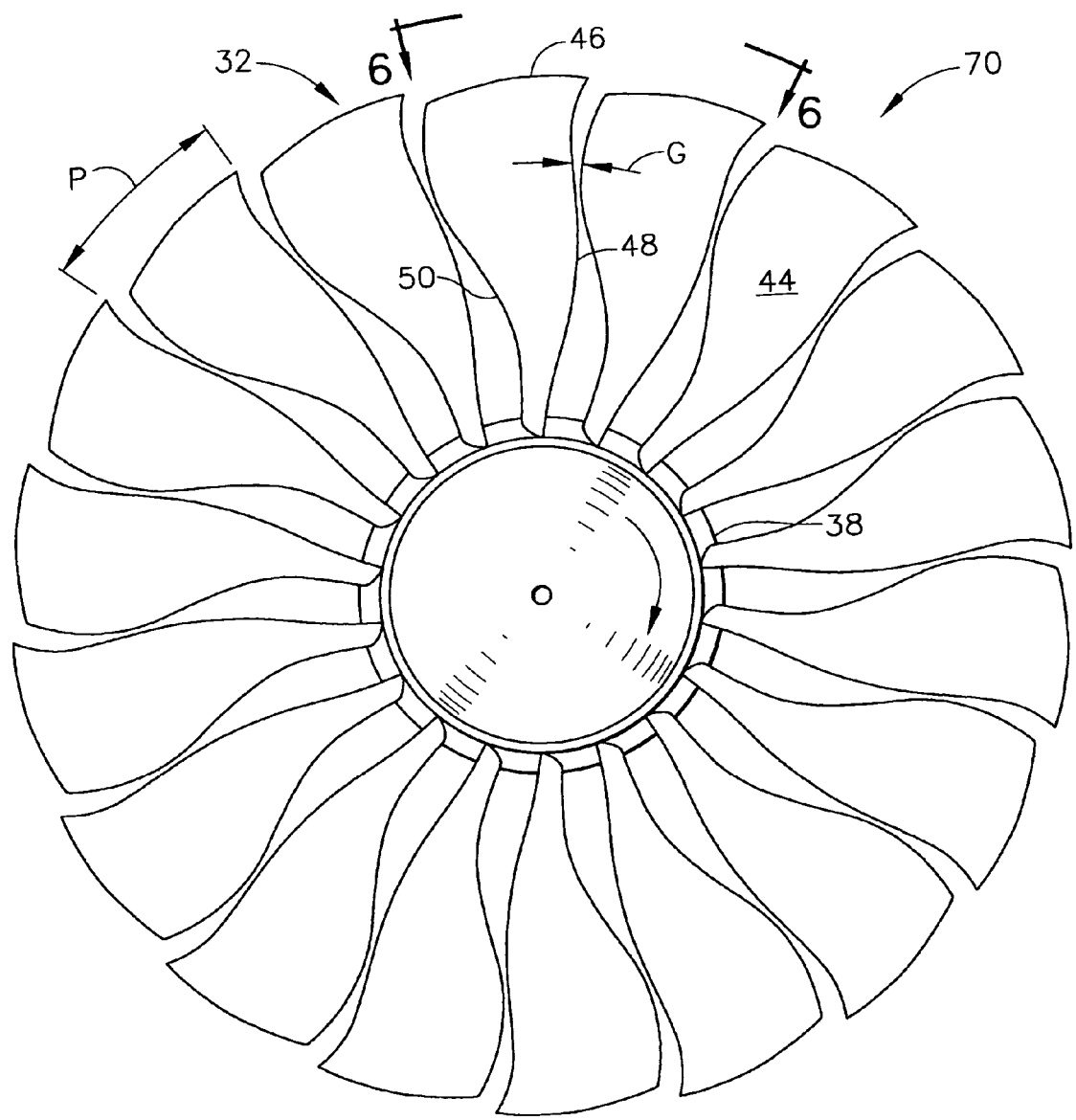
FIG. 5 is a forward-facing-aft elevational view, like FIG. 3, of a turbofan in accordance with another embodiment.
Figure 6:
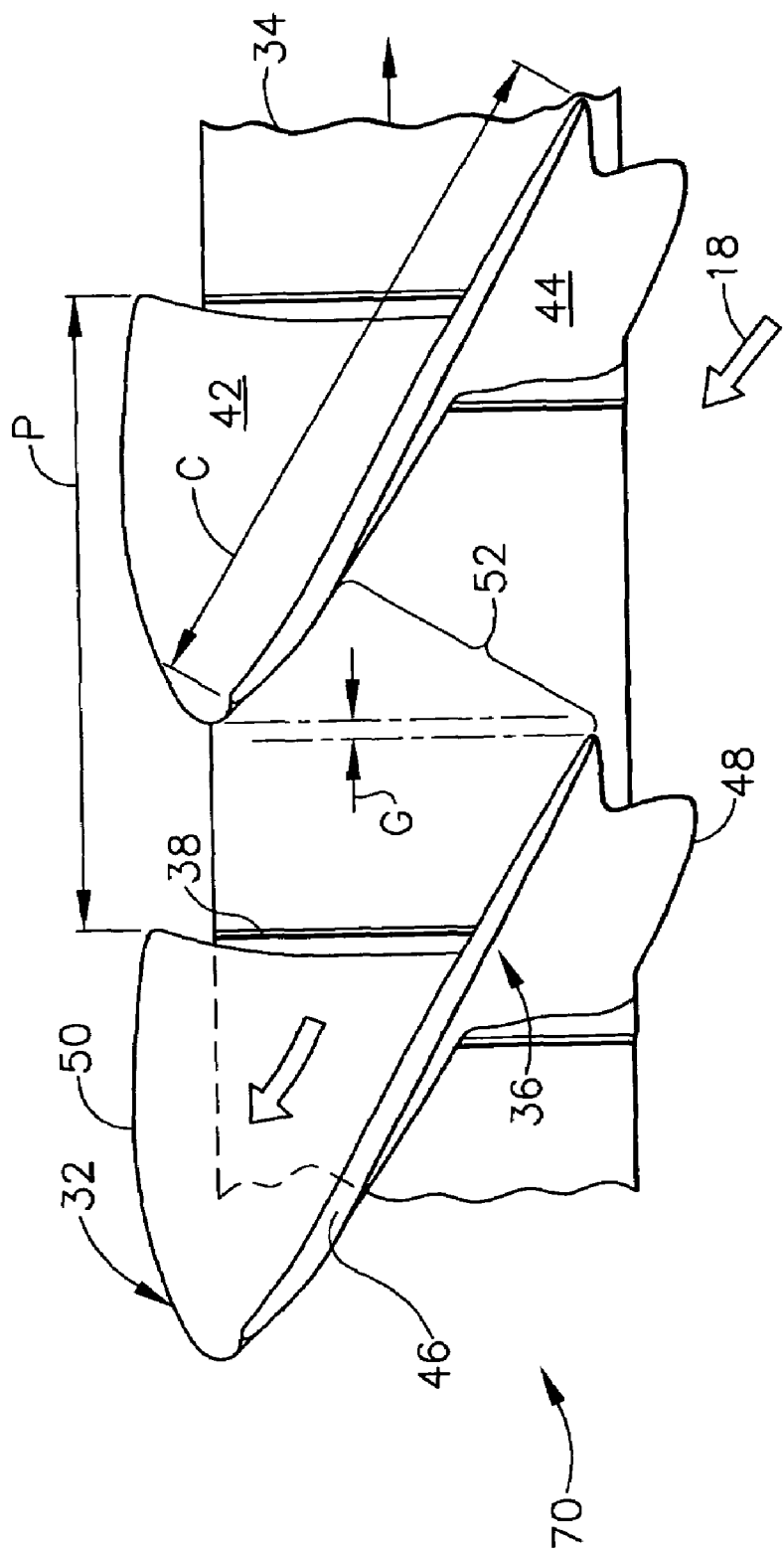
FIG. 6 is a top planiform view of two adjacent fan blades in the turbofan illustrated in FIG. 5 and taken along line 6-6.

FIGS. 5 and 6 illustrate a second embodiment or species of the turbofan, designated 70, having low solidity due to a further reduction in blade count to only eighteen fan blades 32 with the same chord to diameter C/D ratio at the airfoil tips as that found in the first embodiment, with both embodiments having a solidity greater than about 1.0.

In both embodiments of the turbofans, the blades thereof are sized and configured in accordance with modern practice for pressurizing the air 18 under a relatively large aerodynamic loading. Aerodynamic loading is a conventional parameter defined by the ratio of the specific enthalpy rise axially across the airfoils 36 over the square of velocity of the airfoil tips 46 at a corresponding design point, like cruise operation.

A modern turbofan has the highest aerodynamic loading found in fans of any type, and are well contrasted with non-aircraft engine fans typically found in automobiles and appliances and other commercial applications. For example, the aerodynamic loading of the turbofans illustrated in the several Figures may have a value of at least about 0.29, and cooperates with the relatively high pressure ratio of the fans greater than about 1.5, and the high bypass ratio of the turbofan engine for producing substantial propulsion thrust during operation.

In the typical turbofan aircraft engine application, the fan blades have relatively large diameter and are rotated for achieving supersonic tip velocities thereof. Accordingly, the converging-diverging flow passages 52 illustrated in FIG. 4, for example, are specifically sized and configured for receiving supersonic flow of the incident ambient air 18 at the leading edges 48, which will be followed in turn by shock in the passages, and subsonic diffusion aft of the throats 56.

As indicated above, the slope angles of the opposing pressure and suction sides of the adjacent airfoils may be selected for creating a specifically converging portion of each flow passage between the mouth 54 and the throat 56, and a specifically diverging portion between the throat 56 and outlet 58 for maximizing efficiency of flow diffusion in the subsonic flow following the choked flow at the flow passage throat.

In the first embodiment illustrated in FIGS. 3 and 4, the blade row includes only twenty fan blades 32, and the tip solidity is about 1.17.

The adjacent airfoils 36 in this embodiment have a circumferential gap G near or at the tips 46, followed radially inwardly by slight circumferential overlap between the airfoils, with the trailing edge 50 of the leading airfoil being hidden behind the leading edge 48 of the following airfoil when viewed from the front.

Radially inwardly below the airfoil overlap, the circumferential gap reappears and increases towards and near the airfoil roots. For example, adjacent airfoils may have the tip gap over the top ten percent of the radial span, circumferential overlap over the next 40 percent of the span, with additional circumferential gap over the bottom 50 percent of the span.

In the second embodiment illustrated in FIGS. 5 and 6, the blade row includes only eighteen fan blades 32 with an even lower tip solidity of about 1.05 due to the reduction in blade count, with the chord to diameter C/D ratio at the blade tips being substantially the same as that in both the first embodiment disclosed above as well as in the pre-existing fan 60 illustrated schematically in FIG. 4.

In this embodiment, the circumferential gap G between adjacent airfoils 36 extends the full radial span from root to tip 46 of the airfoils, without any circumferential overlap therebetween as viewed from the front. The magnitude of the circumferential gap G is substantially smaller than the magnitude of the circumferential pitch P of the blades, which eighteen blades complete the full row thereof with a correspondingly larger pitch attributed to the reduction in blade count.

Nevertheless, the inter-blade flow passages 52 are formed between the adjacent airfoils and enjoy the advantage of the reduced throat blockage thereof, and enhanced performance at supersonic airflow at the blade tips. Like FIG. 4, the FIG. 6 embodiment has a suitably configured converging-diverging flow passage 52 between the adjacent airfoils for providing choked flow at the throat between the mouth and outlet, and subsonic diffusion aft of the throat.

Computational flow dynamic analysis predicts an additional increase in aerodynamic efficiency of the eighteen count turbofan illustrated in FIGS. 5 and 6 over the twenty count turbofan illustrated in FIGS. 3 and 4, while still maintaining an adequate stability and fan stall margin over the operating range. And, both embodiments have improved efficiency over the pre-existing, twenty-two count fan 60 illustrated in FIG. 4 designed in accordance with conventional high solidity teachings.

The low solidity by reduced blade count turbofan disclosed above may be used in various designs of modern turbofan aircraft gas turbine engines for improving efficiency thereof. Particular advantage is obtained for relatively large diameter transonic turbofans in which the blade tips are operated with supersonic airflow.

Accordingly, the engine illustrated in FIG. 1 is used for powering the fan 14 for producing propulsion thrust for powering the aircraft 12 in flight. The airfoil tips 46 are rotated for achieving supersonic flow of the air 18 at the leading edges 48 thereof. The airfoils 36 are aerodynamically loaded to propel the aircraft at cruise with increased efficiency due to the low solidity by blade count reduction, while maintaining stability and stall margin of the fan.

The twenty and eighteen blade count turbofans disclosed above have been analyzed with modern computational flow dynamic analysis, and have been tested in scale model to confirm the increase in aerodynamic efficiency thereof while maintaining adequate stability and stall margin. The analysis and test also confirm reduction in acoustic signature or noise. The reduced blade count correspondingly reduces engine weight and cost.

Low solidity through blade count reduction fewer than eighteen blades has also been investigated, but not tested, in a turbofan having sixteen blade count and the high aerodynamic loading. In this configuration, no significant increase or decrease in efficiency was observed. However, this configuration offers the advantage of reduced weight, which is significant for overall aircraft performance. Nevertheless, such reduced-count designs may be further investigated for confirming whether or not they are practical or viable in a modern turbofan engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A fan for a gas turbine engine comprising:
an annular casing;
a disk disposed coaxially inside said casing and including a row of fan blades extending radially outwardly from a perimeter rim thereof;
each of said blades including an airfoil having circumferentially opposite pressure and suction sides extending radially in span from a root to a tip, and extending axially in chord between opposite leading and trailing edges, with said airfoils defining corresponding flow passages therebetween for pressurizing air;
each of said airfoils including stagger increasing between said root and said tip to position the leading edge of one airfoil circumferentially adjacent to the suction side of the next adjacent airfoil to define a mouth for said flow passage therebetween, with said flow passage converging to a throat aft from said mouth; and
said row including no more than twenty and no less than eighteen of said fan blades having a solidity defined by the ratio of said airfoil chord over the circumferential pitch and being low in magnitude at said tips and no greater than about 1.2 and greater than about 1.0 to position the leading edge of each tip circumferentially near the trailing edge of the next adjacent tip.

2. A fan according to claim 1 wherein:
said airfoil stagger positions the trailing edge of one airfoil circumferentially adjacent to the pressure side of the next adjacent airfoil to define an outlet for said flow passage therebetween; and
said airfoil tips vary in width between said leading and trailing edges to converge said flow passage from said mouth to said throat and diverge said flow passage from said throat to said outlet.

3. A fan according to claim 2 wherein said airfoils include forward aerodynamic sweep at said tips thereof.

4. A fan according to claim 3 wherein said converging-diverging flow passages at said airfoil tips are sized and configured for receiving supersonic flow of said air at said leading edges, followed by shock therein, and with subsonic diffusion aft from said throat.

5. A fan according to claim 4 wherein said tip solidity includes the ratio of chord over diameter having a value to provide a circumferential gap between said leading and trailing edges of adjacent tips.

6. A fan according to claim 5 further comprising:
a smooth annular tip shroud mounted inside said casing and surrounding said airfoil tips, and positioned closely adjacent thereto to define a correspondingly small tip clearance therewith; and
a row of outlet guide vanes extending radially inwardly from said casing and spaced aft from said blade row, and being more than twice in number than said fan blades for reducing noise from said fan.

7. A fan according to claim 6 wherein:
said blade row includes only twenty fan blades; and
adjacent airfoils have said circumferential gap near said tips, followed radially inwardly by circumferential overlap therebetween, and further followed radially inwardly by a circumferential gap near said roots.

8. A fan according to claim 7 wherein said solidity at said tips is about 1.17.

9. A fan according to claim 6 wherein:
said blade row includes only eighteen fan blades; and
said circumferential gap between adjacent airfoils extends from root to tip thereof.

10. A fan according to claim 9 wherein said solidity at said tips is about 1.05.

11. A fan for a gas turbine engine comprising:
an annular casing;
a disk disposed coaxially inside said casing and including a row of fan blades extending radially outwardly from a perimeter rim thereof;
each of said blades including an airfoil having circumferentially opposite pressure and suction sides extending radially in span from a root to a tip, and extending axially in chord between opposite leading and trailing edges, with said airfoils defining corresponding flow passages therebetween for pressurizing air;
each of said airfoils including stagger increasing between said root and said tip to position the leading edge of one airfoil circumferentially adjacent to the suction side of the next adjacent airfoil to define a mouth for said flow passage therebetween, with said flow passage converging to a throat aft from said mouth; and
said row including no more than twenty of said fan blades having a solidity defined by the ratio of said airfoil chord over the circumferential pitch and being low in magnitude at said tips to position the leading edge of each tip circumferentially near the trailing edge of the next adjacent tip and correspondingly increase the width of said throat.

12. A fan according to claim 11 wherein said tip solidity is low in magnitude to provide a circumferential gap between said leading and trailing edges of adjacent tips.

13. A fan according to claim 12 wherein:
said airfoil stagger positions the trailing edge of one airfoil circumferentially adjacent to the pressure side of the next adjacent airfoil to define an outlet for said flow passage therebetween; and
said airfoil tips vary in width between said leading and trailing edges to diverge said flow passage therebetween.

14. A fan according to claim 13 wherein said airfoils include forward aerodynamic sweep at said tips thereof.

15. A fan according to claim 14 further comprising:
a smooth annular tip shroud mounted inside said casing and surrounding said airfoil tips, and positioned closely adjacent thereto to define a correspondingly small tip clearance therewith; and
a row of outlet guide vanes extending radially inwardly from said casing and spaced aft from said blade row, and being more than twice in number than said fan blades for reducing noise from said fan.

16. A fan according to claim 15 wherein said airfoil tips have an axially arcuate contour, and said tip shroud has a complementary axially arcuate contour for maintaining a substantially uniform tip clearance radially therebetween and axially between said leading and trailing edges.

17. A fan according to claim 14 wherein:
said solidity includes the ratio of chord over diameter; and said blade row includes only twenty or only eighteen fan blades, and said chord to diameter ratio at said tips is the same in both species.

18. A fan according to claim 14 wherein said blade row includes twenty or eighteen blades, and said solidity at said tips thereof is greater than about 1.0 and no greater than about 1.2.

19. A fan according to claim 14 wherein said blades are sized and configured for pressurizing said air under an aerodynamic loading having a value of at least about 0.29 and defined by the ratio of the specific enthalpy rise across said airfoils over the square of velocity of said tips.

20. A fan according to claim 14 wherein said diverging flow passages at said airfoil tips are sized and configured for receiving supersonic flow of said air at said leading edges, followed by shock therein, and with subsonic diffusion aft of said throat.

21. A fan according to claim 14 wherein:
said blade row includes only twenty fan blades; and
adjacent airfoils have said circumferential gap near said tips, followed radially inwardly by circumferential overlap therebetween, and further followed radially inwardly by a circumferential gap near said roots.

22. A fan according to claim 21 wherein said solidity at said tips is about 1.17.

23. A fan according to claim 14 wherein:
said blade row includes only eighteen fan blades; and
said circumferential gap between adjacent airfoils extends from root to tip thereof.

24. A fan according to claim 23 wherein said solidity at said tips is about 1.05.

25. A fan according to claim 14 wherein said airfoil tips vary in width between said leading and trailing edges to converge said flow passage from said mouth to said throat and diverge said flow passage from said throat to said outlet.

26. A method of using said fan according to claim 14 comprising:
powering said fan in a turbofan engine for propelling an aircraft in flight;
rotating said airfoil tips for achieving supersonic flow of said air at said leading edges thereof; and
aerodynamically loading said airfoils to propel said aircraft at cruise with increased efficiency due to low solidity while maintaining stability and stall margin of said fan.

27. A method of improving aerodynamic efficiency in said engine according to claim 11 comprising:
deriving said fan from a pre-existing fan design by reducing said solidity at said airfoil tips while maintaining substantially equal the ratio of tip chord over tip diameter of said derived fan and said pre-existing fan; and
increasing area of said flow passages at said throats thereof.

28. A method according to claim 27 further comprising increasing camber of said airfoils at said tips thereof.

* * * * *